United States Patent
Atwood

(10) Patent No.: US 8,074,368 B2
(45) Date of Patent: Dec. 13, 2011

(54) HINGED MEASURING AND MARKING DEVICE

(76) Inventor: Raymond E. Atwood, Los Gatos, CA (US)

( * ) Notice: Subject to any disclaimer, the term of this patent is extended or adjusted under 35 U.S.C. 154(b) by 0 days.

(21) Appl. No.: 12/616,138

(22) Filed: Nov. 11, 2009

(65) Prior Publication Data

US 2010/0139106 A1    Jun. 10, 2010

Related U.S. Application Data

(60) Provisional application No. 61/113,596, filed on Nov. 11, 2008.

(51) Int. Cl.
*B43L 7/12* (2006.01)
(52) U.S. Cl. .................. 33/418; 33/415; 33/465
(58) Field of Classification Search .................. 33/415, 33/418, 452, 465, 474, 475, 478, 481, 529, 33/412
See application file for complete search history.

(56) References Cited

U.S. PATENT DOCUMENTS

| | | | | |
|---|---|---|---|---|
| 387,570 | A * | 8/1888 | Traut | .............. 403/96 |
| 425,698 | A | 4/1890 | Roberts | |
| 1,136,367 | A | 4/1915 | Raymond | |
| 1,320,689 | A * | 11/1919 | Hart | .............. 33/459 |
| 1,648,266 | A * | 11/1927 | Grass | .............. 33/478 |
| 1,882,354 | A * | 10/1932 | Celenza | .............. 33/418 |
| 2,741,030 | A * | 4/1956 | Wise | .............. 33/340 |
| 3,028,686 | A | 7/1961 | Frisch | |
| 4,343,093 | A | 8/1982 | Eadens | |
| 4,361,964 | A | 12/1982 | Hennessee | |
| 4,571,845 | A | 2/1986 | Wright et al. | |
| 4,660,293 | A * | 4/1987 | Kovacs | .............. 33/471 |
| 4,742,619 | A | 5/1988 | Swanson | |
| 5,357,683 | A | 10/1994 | Trevino | |
| 5,392,525 | A * | 2/1995 | Chow | .............. 33/465 |
| 5,701,679 | A * | 12/1997 | Buzikievich | .............. 33/293 |
| 5,727,325 | A | 3/1998 | Mussell | |
| 6,029,359 | A * | 2/2000 | Szumer | .............. 33/373 |
| 6,049,990 | A * | 4/2000 | Holland | .............. 33/464 |
| 6,729,033 | B2 | 5/2004 | Jevons et al. | |
| 6,820,345 | B2 | 11/2004 | Evans | |
| 6,868,616 | B2 | 3/2005 | Allemand | |
| 7,082,692 | B2 * | 8/2006 | Shapiro | .............. 33/473 |
| 7,481,143 | B2 * | 1/2009 | Hiland, Jr. | .............. 33/418 |
| 7,546,687 | B2 * | 6/2009 | Haala | .............. 33/415 |
| 7,574,813 | B1 * | 8/2009 | Boutan | .............. 33/471 |
| 2005/0086818 | A1 * | 4/2005 | Lin | .............. 33/465 |
| 2008/0301962 | A1 * | 12/2008 | Haala | .............. 33/415 |

FOREIGN PATENT DOCUMENTS

JP    63065301    3/1988

* cited by examiner

*Primary Examiner* — Yaritza Guadalupe-McCall

(57) ABSTRACT

An apparatus and method for a hinged measuring and marking device is disclosed herein. The device utilizes a first member, containing a flat surface with a straightedge for marking or measuring, coupled to a second member, also containing a flat surface with a straightedge for measuring or marking wherein the first member is coupled to the second member in a direction perpendicular to the straightedge of the first member. The straightedges of the first and second members are coplanar for marking an approximately contiguous line on a single plane or on two intersecting planes. The first member and the second member can be rotated between 0 and 180 degrees with respect to each other to accommodate marking a line on the two intersecting planes.

4 Claims, 6 Drawing Sheets

HINGED MEASURING AND MARKING DEVICE

REFERENCE TO RELATED APPLICATIONS

This application claims priority to provisional application, Ser. No. 61/113,596, filed Nov. 11, 2008, which application is also incorporated herein by its reference, in its entirety.

FIELD OF THE INVENTION

The present disclosure relates generally to a measuring device and more particularly to a multi-purpose measuring and marking device.

DESCRIPTION OF THE RELATED ART

A desirable goal for constructing or rough framing a building or home project, for building a piece of furniture, for general carpentry, or other similar tasks is to create orthogonal, straight, and/or level lines. The lines can refer to marking lines, or the placement of a structure. The vast majority of buildings, rooms, furniture and other objects are built in an orthogonal manner, e.g., involving right (90 degree) angles with surfaces that are perpendicular to each other. An intersection of two planes, such as two walls in a room, creates an edge. While an intersection of three planes, such as two walls and a ceiling, creates a corner. Interestingly, the untrained eye of a casual observer can detect even a slight amount of misalignment or unevenness in a line or a structure. Consequently, a need arises to create marking or measurement lines or placement of structures in a level and orthogonal manner.

Many objects have features that wrap around an edge, e.g., wallpaper, countertop, crown molding, chair rail, fascia, etc. The precise alignment of these components at an edge is an important feature because it can be a focal point of a room or an object. However, trying to create a straight contiguous line that wraps around an edge can be a frustrating task because the lines are drawn on two different planes. Furthermore, the lines are usually drawn in two separate steps, e.g., placing a straightedge on a first plane and drawing a first line, then moving the straightedge to a second plane, attempting to realign the straightedge as close as possible to the first line on the first plane, then drawing a second line in the second plane, while keeping both lines as coplanar. By using two separate steps, a straightedge drawn on each of the two intersecting planes may be uneven or may have a misaligned intersection or angle with respect to each other. Thus a need arises to overcome the time-consuming and imprecise method of drawing a contiguous or matching line on each of a plurality of planes that intersect.

Two different types of edges exist: an outside edge and an inside edge. Each type has its own unique challenges for measuring and marking. Thus, a need arises for an apparatus and a method to provide a straight, even, and/or contiguous line on two planes intersecting at either an inside or an outside edge. Straightedge tools are usually designed as one-piece tools to avoid inaccurate lines or angles that may otherwise arise from loose joints in a multi-piece tool. However, one-piece tools can be large, long, or bulky which only encourages handling damage and ultimately compromises the originally sought accuracy. Consequently, a need arises for a straightedge tool that is accurate but not bulky or unwieldy. Finally, if a tool can perform a new function plus a legacy function, then it can simply replace the legacy tool. Thus, a need arises for a new tool to provide multiple functions, including a legacy function plus new functions that meets the aforementioned needs in order to reduce the total quantity of tools a craftsperson may need while increasing their capabilities.

SUMMARY OF THE INVENTION

The present disclosure of the invention provides a method and apparatus with several embodiments that overcome the limitations of, provide improvements to, and/or satisfy the needs of: creating marking or measurement lines or placement of structures in a level and orthogonal manner, overcoming the time-consuming and imprecise method of drawing a contiguous or matching line on each of one or more, e.g., a plurality, of planes that intersect; having a straightedge tool that is accurate but not bulky or unwieldy; and performing multiple functions including that of legacy tools.

Beneficially, the present disclosure provides a multi-purpose tool that is geometrically and functionally configurable. In a closed position, the tool is compact for storage or for common functions such as a triangular measuring and marking tool saw guide. In a partially open position, the tool functions as a measuring and marking tool around edges of intersecting planes. And in its fully-open position of 180 degrees, the tool functions as a larger triangular measuring and marking device.

A first embodiment of the present disclosure provides a tool for marking or measuring, wherein the tool comprises a first member containing a flat surface with a straightedge for marking or measuring; a second member containing a flat surface with a straightedge for marking or measuring; wherein the first member is coupled to the second member along an axis perpendicular to the straightedge of the first measuring instrument; and wherein the straightedge of the first member and the straightedge of the second member are coplanar for marking an approximately contiguous line on one or more planes when the first member and the second member are rotated to one of a plurality of angle positions with respect to each other.

The straightedge of the first member and the straightedge of the second member are collinear when the first member and the second member are rotated to be coplanar, e.g., the tool is opened up to lay flat along a single plane. The first and second members can from an infinitely variable angle position between each other, e.g., the plurality of angle positions include angles that create approximately parallel, perpendicular, or oblique relationships between the first member and the second member. The plurality of angle positions includes angles of approximately 0 and 180 degrees to mark a straight line in one plane. Alternatively, the plurality of angle positions may include an angle of approximately 90 degrees to mark a contiguous coplanar line along the straightedge of the first member and the straightedge of the second member in a plurality of actually or virtually intersecting or perpendicular planes.

The hinge that couples the first member to the second member can be either a length of flexible material or a rotatable joint that is attached to the first member and the second member at two or more points. For example, the hinge can be a pivot, butt, or continuous hinge, and a head of the hinge is countersunk from, or flush with, the plane formed by the straightedge of the first member and the second member. The hinge can optionally have an interference fit for providing resistance during rotation to maintain a preset angle between the first member and the second member. The hinge can also use detents to create preferred angle positions of 0, 45, 90, and 180 degrees between the first and second members.

The first and second members of the tool can be any shape such as right triangles coupled to each other, with each of the right triangles having a hypotenuse that is a straightedge. In another embodiment, the first and or second member of the tool can have the two legs of a right triangle, with the linear hypotenuse being substituted by a curved edge, e.g., a quarter circle or any nonlinear shape. The first member and second member can rotate to approximately 0 degrees rotation between each other to form an outline shape not greater than the composite shape of the first member rotated closed on top of the second member. The first member of the measuring tool has a length and a height, wherein the height is at least approximately 50-100% of the length and wherein the first member and the second member are right triangles coupled together to form a third and larger triangle.

The tool is used by applying the tool to an object or work piece by initially placing the first member on a first plane and placing the second member on a second plane that intersects the first plane to form an edge and drawing a line along the straightedge of the first member on the first plane and along the straightedge of the second member on the second plane in a single step without having to reposition the measuring tool from the first plane to the second plane.

These and other advantages of the present disclosure will become apparent to those of ordinary skill in the art after having read the following detailed description of the preferred embodiments, which are also illustrated in the various drawing figures.

BRIEF DESCRIPTION OF THE DRAWINGS

The drawings included herewith are incorporated in and form a part of this specification. The drawings illustrate one embodiment of the present disclosure and, together with the description, serve to explain the principles of the invention. It should be understood that drawings referred to in this description are not drawn to scale unless specifically noted.

DETAILED DESCRIPTION OF THE INVENTION

Reference will now be made in detail to the preferred embodiments of the invention. Examples of the preferred embodiment are illustrated in the accompanying drawings. While the invention will be described in conjunction with the preferred embodiments, it is understood that the invention is not limited to these embodiments. Rather, the invention is intended to cover alternatives, modifications and equivalents, which may be included within the spirit and scope of the invention, as defined by the appended claims. Additionally, in the following detailed description of the present disclosure, numerous specific details are set forth in order to provide a thorough understanding of embodiments of the present invention. However, it will be apparent to one of ordinary skill in the art that the present invention may be practiced without these specific details. In other instances, well-known methods, procedures, components, and operations have not been described in detail so as not to unnecessarily obscure aspects of the present invention.

FIGS. 1A through 5B present a tool 100 with multiple configurations, geometries, and functions such as: opening tool 100 to a fully-open 180 degree position so it functions as a larger measuring, marking, square and straightedge device; folding tool 100 to a fully closed position for use as a smaller triangular measuring and marking tool, or for specialty functions such as a tri square, miter square, protractor, line scriber, saw guide and for convenient storage; and opening tool 100 partially open position, e.g., between 0-180 degrees, for use in measuring and marking around outside corners.

Figure 1A:
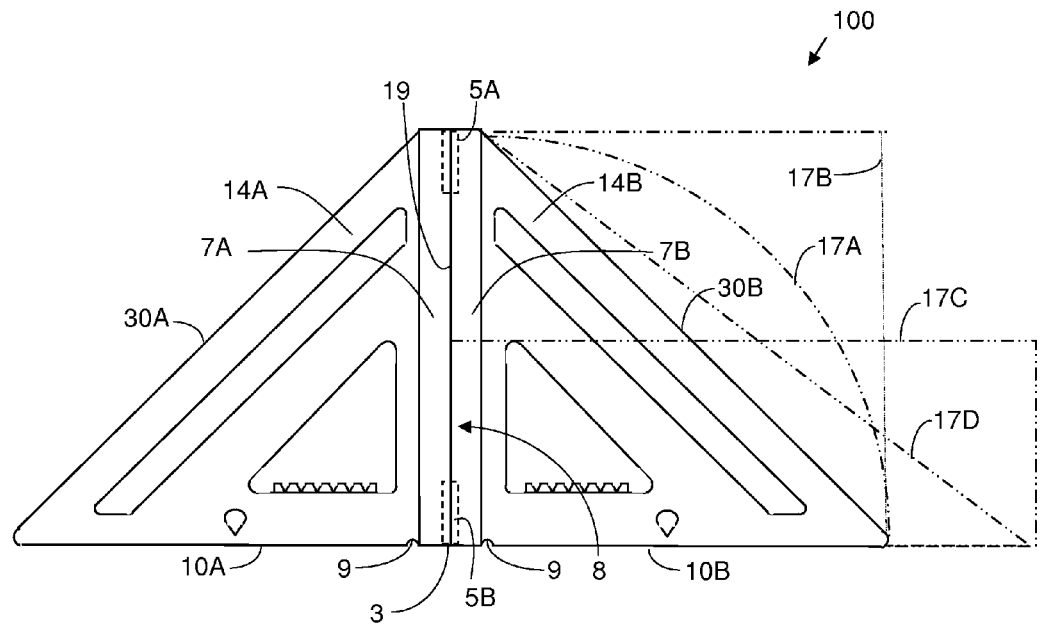
FIG. 1A is a plan view of a tool, in a fully opened position, for measuring and marking.

Referring now to FIG. 1A a plan view of tool 100 in a fully opened position for measuring and marking is shown, in accordance with one embodiment of the present disclosure. Tool 100 includes a first member 14A rotatably or flexibly coupled along an axis 8 via any type of hinge or joint to a second member 14B, e.g., via a plurality of hinges 5A and 5B located at a top and a bottom position of an inner or first leg. Multiple hinges 5A and 5B couple an inner leg of each of first and second members 14A and 14B along an axis 8 that is perpendicular to straightedges 10A and 10B in order to allow rotation of first member 14A and second member 14B in a clamshell or non-coplanar manner over an infinitely variable number of rotational positions or angles while maintaining straightedges 10A and 10B in a single virtual 2-D plane. In the present position of FIG. 1A, tool 100 is expanded to an "open" position of 180 degrees where first member 14A and second member 14B are coplanar, e.g., reside in a same single plane. In this fully open position, straightedges 10A and 10B are in a collinear position, e.g., they exist on the same single straight line, in order to provide an accurate and stable measuring or marking function along essentially contiguous and cumulative straightedges 10A and 10B. A top, or head, portion 3 of hinge 5 is countersunk from, or flush with, straightedges 10A and 10B so as not to interrupt the continuity of straightedges 10A and 10B. Thus, the coupling of straightedges 10A and 10B in present embodiment selectively provides a position of tool 100 for marking a line or making a measurement along a straightedge having an accumulated length of 12A plus 12B. Optional pivot points 9 are provided in straightedges 10A, 10B for specialty marking applications.

Figures 1B, 1C, 1D:
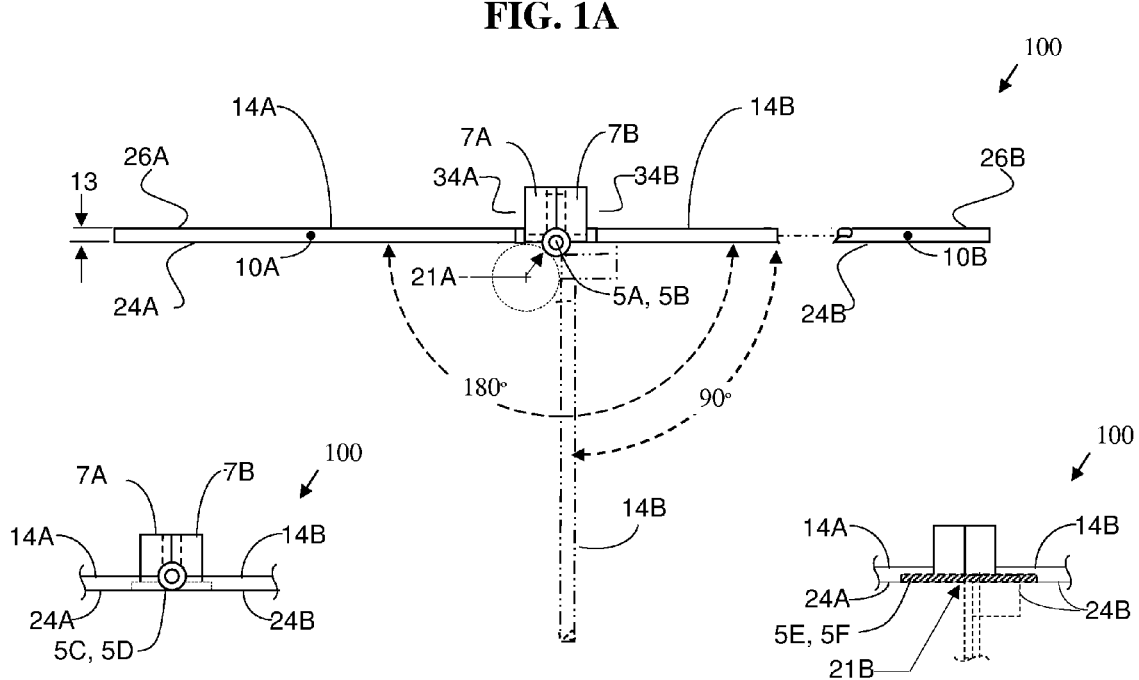
FIG. 1B is a side view of a tool, in a fully opened position, for measuring and marking.
FIGS. 1C and 1D are partial bottom views of a tool, with a flush hinges in a fully opened position, for measuring and marking.

First member 14A and second member 14B are substantially flat, planar, rigid, and triangular pieces, in one embodiment, made of any suitable material for measuring and marking equipment, such as plastic, metal, etc. that provide robustness as well as durability and dimensional stability in a variety of working temperatures and environments. First member 14A may be made of transparent material throughout or simply at edges to allow visibility of marking indicia on second member 14B beneath it, when tool 100 is in the closed configuration. In this manner, first member 14A has precision marking and functionality such as a scribe bar, while second member 14B can be primarily used for marking around an edge and has reduced or no marking features, e.g., for reduced cost. The triangular shape of first and second members 14A and 14B are mirror images of a right isosceles triangle, in the present embodiment, with length of legs, or straightedges, 10A and 10B approximately equal to a length of inner legs 19 and or abutments 7A and 7B. Abutments 7A and/or 7B can have lengths shorter than leg 19, or can simply exist at the ends of leg 19, in another embodiment. However, the present disclosure is well suited to any size and shape for any sides, excepting straightedges 10A and 10B that should be straight and perpendicular to flat bottom surfaces 24A and 24B, as shown in FIG. 1B. However, in another embodiment, straightedges 10A and/or 10B may have a bevel along the straightedge where measuring indicia are provided on the bevel; on the top surface 14A or 14B, or on a small portion of the straightedge which has a surface perpendicular to bottom surface 24A and/or 24B for providing a suitable land of material along which a line may be drawn, e.g., using a pencil. Any other side of members 14A and 14B may have cuts or scallops, e.g., on hypotenuse 30A and 30B, or inner legs 19, or may be a semicircle or quarter circle shape 17A, square shape 17B, rectangle shape 17C, scalene right triangle 17D, etc. and that may be either asymmetric or symmetric with respect to first and second members 14A and 14B. If one member, e.g. 14A is smaller than the other member, e.g., 14B, then markings of the larger member may be visible In another embodiment, first and second members 14A and 14B are scalene right triangles, with asymmetric triangle leg lengths, e.g., one leg height being approximately 10-100%, 25-100%, or 50-100% of the other leg height to provide stability of tool 100 against a workpiece, e.g., an edge of a wall. In the present embodiment members 14A and 14B are two triangles coupled to each other to form a third and larger triangle.

Referring now to FIG. 1B, a side view of tool 100 in the fully opened position for measuring and marking is shown, in accordance with one embodiment of the present disclosure. A first, or top, surfaces 26A and 26B of first and second members 14A and 14B are flat in the present embodiment up to the abutments 7A and 7B, though they can be any shape in another embodiment, e.g., flat, curved or faceted, parallel or obtuse to second, or bottom, surface 24A and 24B, or symmetrical or asymmetrical to each other, with multiple scales or dimensioning formats on top surface 26A and 26B and/or bottom surfaces 24A and 24B. Bottom or second surfaces 24A and 24B of first and second members 14A and 14B in the present embodiment are flat and planar to stably rest against a flat work piece for various measuring or marking functions. Ledges 34A and 34B are sides of abutments 7A and 7B that rise above top surfaces 26A and 26B and are useful for marking functions along an edge of a workpiece, e.g., parallel lines, angle measurements, and for use as a fence to make saw cuts, draw parallel lines, etc.

First and second member 14A and 14B, as shown in the present embodiment, have an oblique rotational position of approximately 180 degrees, where they are coplanar, as respectively coupled first abutment 7A and second abutment 7B that are closed against each other. Alternatively second member 14B may be infinitely and variably rotated anywhere between 0 and 180 degrees, as shown by the exemplary embodiment of 90 degrees with dashed outline of second member 14B. In the 90 degree position, tool 100 would accommodate an edge of an object, e.g., a joist edge, having a radius of 21A, depending upon the size of hinges 5A and 5B; the smaller the hinge, the smaller the edge radius that can be accommodated by tool 100.

The present embodiment is well-suited to any diameter for hinges 5A and 5B, e.g., as applicable for creating a sturdy or flexible hinged joint and for ease of opening, closing, static angle memory between the two members, the size of the tool and the potential application. First and second member 14A and 14B may be retained at a given angular rotation, e.g., the present embodiment 180 degrees, by providing: a mechanical load on one or more hinges 5A and/or 5B, e.g., using a thumb screw (not shown) on the axis of the hinge pin that would tighten axially or radially on the hinge pin; using an interference fit of the hinge and hinge pin that would create a constant load for all rotational positions; using detents in the hinge located at preferred positions; using a cam-shaped hinge and hinge pin with interference fits at preferred angles; using a spring loaded member to create tension on the joint; or any other means of providing memory or variable settings for angles. Preferred angles include angles such as 0, 45, 90, 180 degrees, as well as angles there between, or at other discrete desired angles for a wide variety of potential applications. Alternatively, the coupling between the members is loose, allowing free movement of the members with respect to each other.

There are a wide variety of pivots, hinges, swivel coupling, and other mechanisms that will accomplish the functions of tool 100 stated herein. For example, hinge 5 can be any type of hinge, e.g., pivot, butt, two-loop butt hinge, barrel hinge, continuous hinge, concealed hinge, or any other structure that allows the functionality described herein. Hinge 5 can also be an integral part of first and/or second members 14A and 14B in that a portion of the hinge is formed into a portion of first and/or second members 14A and 14B or abutments 7A and 7B, e.g., being cast into, or cut out of either portions, such that a pin is used to assemble the first and second members 14A and 14B together. In the case of a continuous hinge, the hinge may be a single piece, but has effectively a body length sufficient to ensure accurate rotation of first member 14A about second member 14B while maintaining straightedges 10A and 10B in a single virtual 2-D plane. Hinge 5 can be made as an integral part of the members, wherein the members and hinge are cast as one unit, e.g., for a plastic or polymer material, wherein the hinge could be a necked down, creased, or configured as a so-called live or living hinge. In addition, any hinging mechanism may be incorporated at this junction including, but not limited to, metal, tape, or other material or hinging mechanisms.

First and second members 14A and 14B have a thickness 13 for straightedges 10A and 10B that encompass a wide range of values, depending upon the application. The thickness can be the same or different for each member 14A or 14B, depending upon the application. Hinges 5A and 5B protrude from plane of bottom surfaces 24A and 24B in the present embodiment so as to allow for complete closure at 0 degrees of rotation between first and second members 14A and 14B. One or more hinges in the present embodiment can join first and second member 14A and 14B at two or more points, thus allowing members 14A and 14B to open and close the tool along a virtual axis, e.g., the axis formed by the pins of a hinge, or the fold points of a flexible membrane. The two or more points where members of tool are coupled can be one point, or span, along a length of first member 14A, and one point, or span, along a length of second member 14B, wherein the hinge would be sufficiently long to offer a reliable opening and closing of the two members about the axis of the hinge, e.g., so that it would maintain the coplanarity of the straightedges 10A and 10B. Alternatively, two or more discrete hinges can be placed at two or more points, or spans, along first and second members 14A and 14B.

Tool 100 has variable configurations that allow it be used in a plurality of applications. For example, tool 100 may be used with bottom surfaces 24A and 24B against a flat workpiece, or may be flipped over to use abutments 7A and 7B or ledges 34A and 34B as a fence against an edge of a workpiece for various length or angle measurements and markings in conjunction with notches 9. Furthermore, abutments 7A and 7B and ledges 34A and 34B are located at the lengthwise center of tool 100, with first and second members 14A and 14B extending outward from it. Thus, tool 100 may utilize asymmetric triangles, markings or functions on each of the first and second members 14A and 14B that can be accessed by rotating the tool to gain access to the other member.

In another embodiment, as shown in FIG. 1C, hinges 5C and 5D are recessed into first and second members 14A and 14B or abutments 7A and 7B so as to be recessed from, or flush and flat with, bottom surfaces 24A and 24B. In this embodiment, tool 100 is essentially flat on bottom surfaces 24A and 24B and hinges 5C and 5D to provide more accurate measuring and marking on a flat workpiece and on an edge of a workpiece whose sharp, or small, radii might otherwise interfere with a protruding hinge. In yet another embodiment that utilizes a flush hinge, as shown in FIG. 1D, pliable strap hinges 5E and 5F coupled at, and countersunk in, first and second member 14A and 14B so as to be flush and flat with bottom surfaces 24A and 24B. Strap hinges 5E and 5F, located at either end of legs 19, may alternatively be a single piece strap hinge with a sufficient length to provide stability for first and second members 14A and 14B. Strap hinges 5E and 5F may use a flexible material or membrane, e.g., rubber or composite material with metallic or non-metallic fiber reinforcements etc. that allows first and second members 14A and 14B to rotate, e.g., in a clamshell manner, while maintaining straightedges 10A and 10B in a single virtual 2-D plane. In the present embodiment, tool 100 is flat on bottom surfaces 24A and 24B and on hinges 5E and 5F to provide more accurate measuring and marking on a flat workpiece and on a sharp, or small, radii edge of a workpiece around which tool 100 will span.

Figures 2A, 2B:
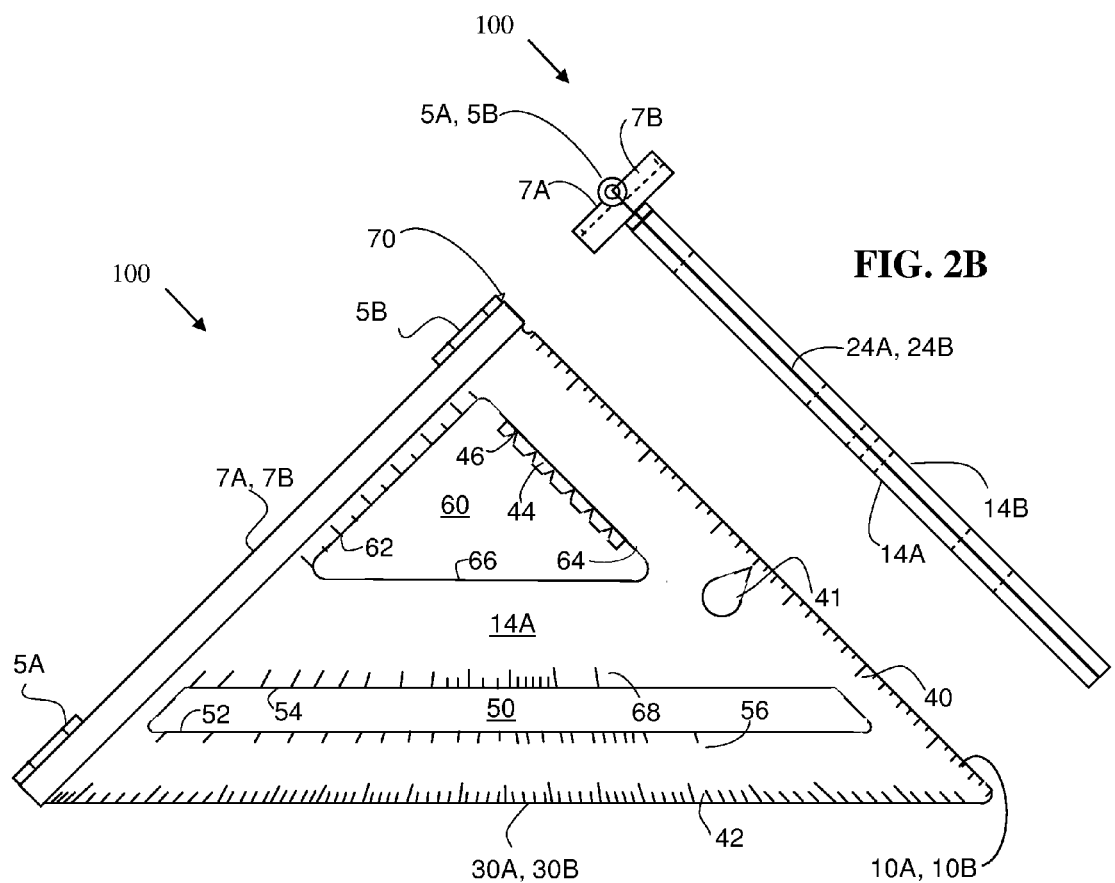
FIG. 2A is a front view of a tool, in a fully closed position, with multiple indices for measuring and marking.
FIG. 2B is a side view of a tool, in a fully closed position, with multiple indices for measuring and marking.

Referring now to FIG. 2A a front view of a tool 100, in a fully closed position, with multiple indices for measuring and marking is shown, accordance with one embodiment of the present disclosure. First and second members 14A and 14B are rotated to approximately 0 degrees rotation between each other in order to close on top of each other to make an outline shape approximately equivalent to first or second members 14A and 14B for convenient usage or storage. Thus, while only member 14A appears in FIG. 2, member 14B is still folded beneath it, and will thusly be referenced as well, in this figure description. If the first and second members 14A and 14B are asymmetric, then the outline of tool 100 in the closed will have a composite outline based on the combined outer surfaces of both first and second members 14A and 14B. Tool 100 closes completely with flush flexible hinges 5E and 5F of FIG. 1D and with hinges 5A and 5B of the present figure having a centerline located on the plane of bottom surfaces 24A and 24B. Other hinge locations may allow for various degrees of closure depending upon their placement made for a primary purpose of accommodating various sizes of edge radii. With hinges 5A and 5B having an interference fit, tool 100 can remain in the closed position without falling open due to a loose joint, and thus provide a more predictable and stable tool. To keep tool 100 with flexible hinges 5E and 5F of FIG. 1D closed, a strap, snap, or other feature may be used to keep members 14A and 14B closed against each other for storage.

Tool 100 is suitable to a wide variety of measurement markings, internal apertures, notches, etc. For example, straightedges 10A and 10B can both have linear marking indicia ranging across its length in any form of units, e.g., metric or standard, binary fractionalization or decimal, and in any increments. In one embodiment, a plurality of parallelly arranged increments of different graduations or units is included. Similarly, hypotenuse or third side edges, 30A and/or 30B have angle marking indicia 42 on one or both top surfaces 26A and 26B and/or on one or both bottom surfaces 24A and 24B of both members 14A and 14B as shown in FIG. 1B. In the present embodiment, angle marking indicia define a scale of degrees, in any form of graduations.

The present embodiment of tool 100 includes a triangular aperture 60 and an elongated aperture 50 in first and/or second members 14A and 14B for specialty measuring functions. Elongated aperture 50 is bounded by straight edges 52 and 54 that are parallel to each other and parallel to hypotenuse or third side edges 30A, 30B. Hip and valley marking indicia 68 are formed on one or both the top surfaces 26A and 26B and/or on one or both bottom planar surfaces 24A and 24B, as shown in FIG. 1B, along straight edge 54 of elongated aperture. In the present embodiment, for example, first hip and valley marking indicia 58 define a scale of degrees for measuring plumb lines for hip and valley rafters. In another embodiment, hypotenuse or third side edges 30A or 30B can be nonlinear, e.g., a quarter circle, arc, curve, etc.

Common rafter marking indicia 56 are formed on one or both the top planar surfaces 26A and 26B and/or on one or both bottom planar surfaces 24A and 24B, as shown in FIG. 1B, along straight edge 52 of elongated aperture for measuring plumb lines for common rafters. In the present embodiment, for example, common rafter marking indicia 56 define a scale of unit rise values corresponding to the rise in inches per every 12 inches of horizontal rafter run, though other scales may be used.

Each planar member also includes a right triangle aperture 60 having a first inner side edge 62 that intersects a second inner side edge 64 at a right angle, and a third inner side edge 66 representing the hypotenuse. The hypotenuse or third inner side edge 66 is parallel to the straight edges 52 and 54 of elongated aperture 50 and is spaced apart from straight edge 54. The first inner side edge 62 of the triangular aperture 60 is parallel to the abutments 7A and 7B and is spaced apart inwardly thereof a nominal distance. The second inner side edge 64 of the triangular aperture 60 is parallel to straightedges 10A and 10B of the planar member and spaced apart inwardly therefrom. The second inner side edge 64 includes an optional scribe bar 44 which is located parallel to the second side edge 10A and 10B and has a plurality of indentations 46 spaced at any graduated intervals that may correspond to distance marking indicia 40 formed along the straightedges 10A and 10B. A marking indicia 41 is placed at the 3½ inch point of straightedges 10A and 10B for marking standard 2×4 framing measurements. However, in another embodiment, additional marking indicia may be placed at the 5½ inch point of straightedges 10A and 10B to accommodate code requirements of 2×6 framing. In one embodiment, marking scribe bar 44 is used on only one member, e.g., first member 14A, with opposite member, e.g., second member 14B having a sufficiently large aperture to allow access to scribe bar 44 when applied to a work piece.

Tool 100 can include an optional pivot pin 70, as shown in FIG. 2A only, to create a compass function for tool 100 to draw an arc, circle, or portion thereof on a work piece. The compass function is implemented by driving pivot pin 70 into the work piece as a shallow indentation, followed by manually holding a marking instrument such as a pencil to one of the members 14A or 14B at a given radius, or in an indentation of one of the graduations of marking indicia 40, or by any other mechanical means of retention, and rotating tool 100 about the axis. Pivot pin 70 can be a permanent protrusion or an extendable protrusion, e.g., a spring loaded, screw-out, or other manually adjustable protrusion from hinge 5B, e.g., as portion of a hinge pin. Pivot pin 70 is sufficiently short to avoid marring a work piece or causing incidental injury to an operator of the tool, but sufficiently long, sharp, and hard to insert and retain the position of tool 100 in a work piece.

FIG. 2B is a side view of tool 100, in a fully closed position, with multiple indices for measuring and marking, in accordance with one embodiment of the present invention. With hinges 5A and 5B positioned with respect to bottom surfaces 24A and 24B, the bottom surfaces 24A and 24B are now able to close face to face, for convenient storage and usage of tool 100 as a triangle, with its specialized functions, e.g., common rafter markings, use of abutments 7A and 7B, etc.

Figure 3A:
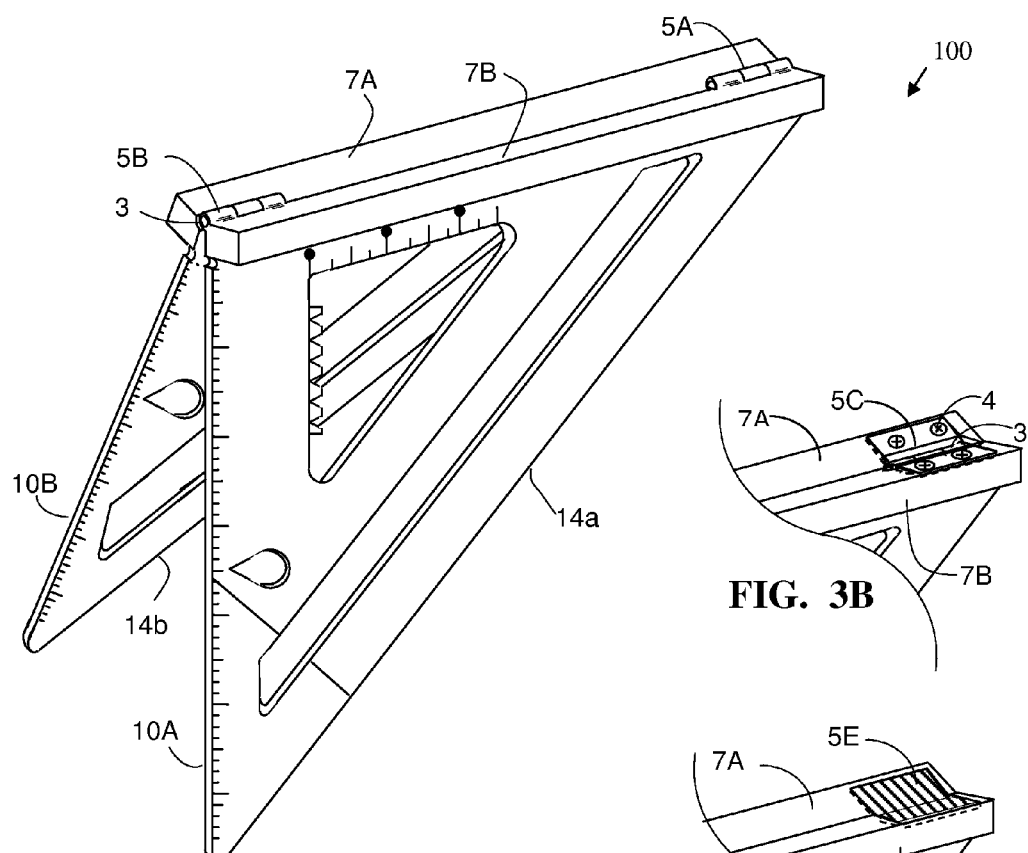
FIGS. 3A-3E are isometric views of a tool, in a partially opened position with different hinge embodiments, for measuring and marking.

Referring now to FIG. 3A-3E isometric views of a tool 100, in a partially opened position with different hinge embodiments, for measuring and marking device is shown, accordance with one embodiment of the present disclosure. First and second member 14A and 14B of tool 100 open in a clamshell or non-coplanar manner at angles other than 180 degrees, or multiples thereof, while straightedges 10A and 10B remain in a single virtual 2-D plane at all angles of rotation. Hinges 5A-5B are illustrated in FIG. 3A as a hinge device integrated into abutment 7A and 7B or into first and second members 14A and 14B by any method, e.g., cast or molded especially as any type of plastic, milled from a billet, welded together as pieces, etc.

Figure 3B:
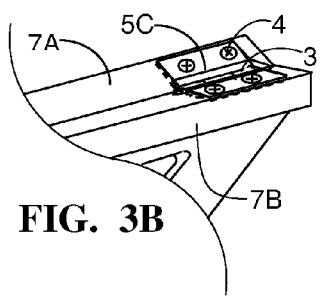
Figure 3C:
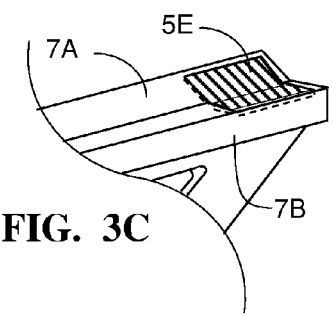
Figure 3D:
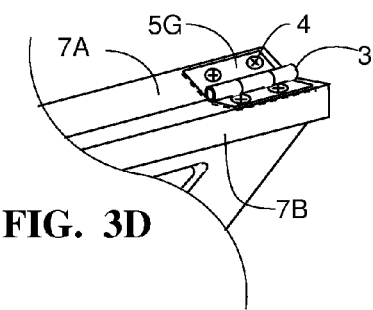

In contrast, alternative configurations in FIGS. 3B-3D mount hinges 5C, 5E, and 5G as in a countersink of abutment 7A and 7B, as shown by dashed lines, so as to be partially or fully flush with surface of abutment 7A and 7B, though this is not required. Hinge 5C in FIG. 3B corresponds to hinge 5C in FIG. 1C. Hinges 5C and 5G are similar to a standard hinge. In contrast, the entire hinge 5C is countersunk into abutments 7A and 7B, e.g., including head 3, while hinge 5G is not entirely countersunk, e.g., body and head 3 of hinge is above abutments 7A and 7B. Hinge 5E in FIG. 3C is a flush mount pliable strap hinge, which corresponds with hinges 5E and 5F in FIG. 1D.

Figure 3E:
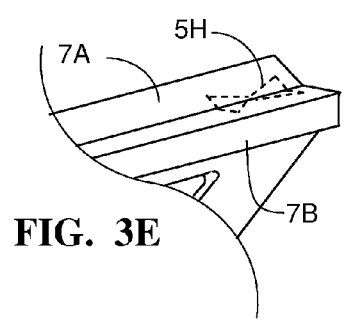

Hinge 5H in FIG. 3E is an integral joint, or hinge, created using same material as abutments 7A and 7B, as well as optionally the same materials as members of the tool. For example, hinge 5H can be implemented as discrete hinges, e.g., live hinges, shown as dashed lines, located in one or more points along abutment 7A and 7B or along members, e.g., at the top, bottom, middle or along any part of the length of abutments or of leg of members, or could be a continuously created hinge or joint along any portion of the leg of members where the tool closes and opens. In this embodiment, hinge 5H can be made of the same material as the abutment and/or the member of the tool, thus allowing the manufacturing of the basic form of the tool in essentially a single step, e.g., a single injection molding to make the members and hinge of the tool. Alternatively, hinge 5H can be integrally formed with abutments 7A and 7B, which then could be assembled to member pieces.

Figure 4:
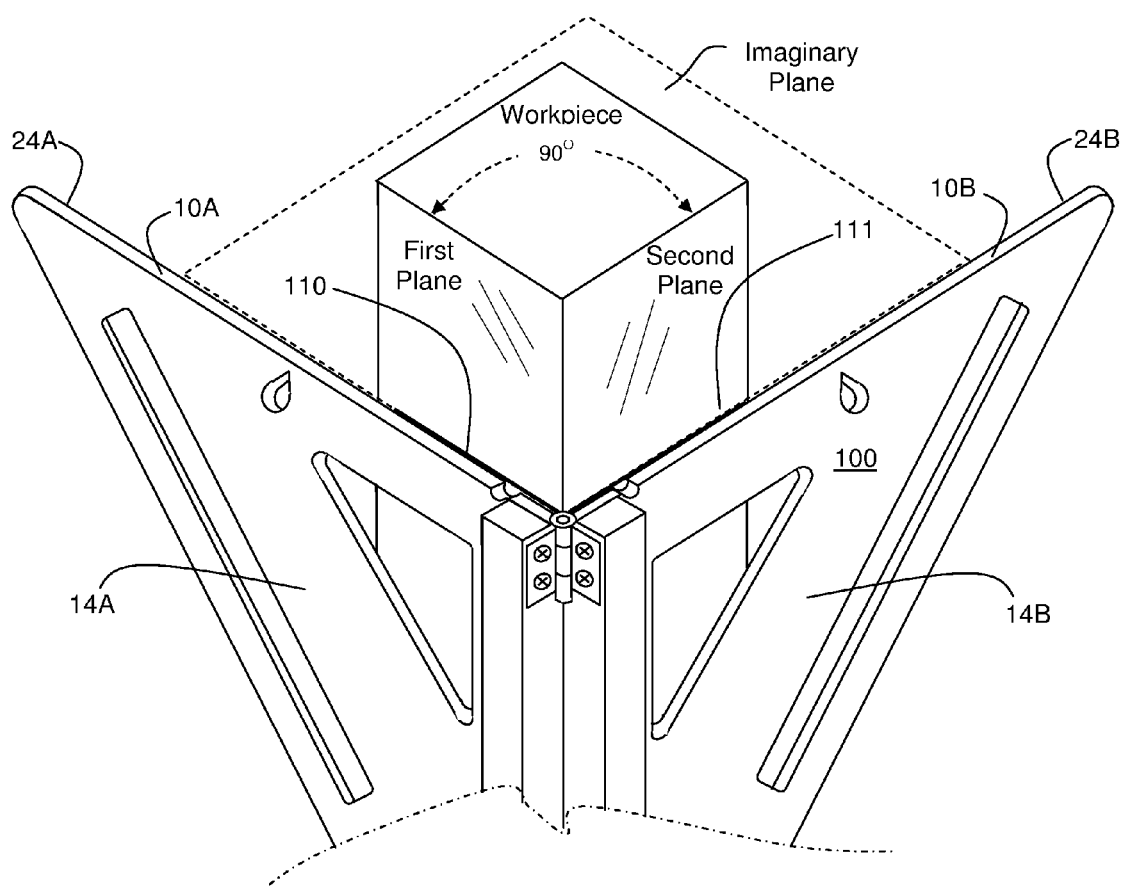
FIG. 4 is an isometric view of a tool opened to 90 degrees and placed against an outside edge of a square workpiece, for measuring and marking.
Figure 5:
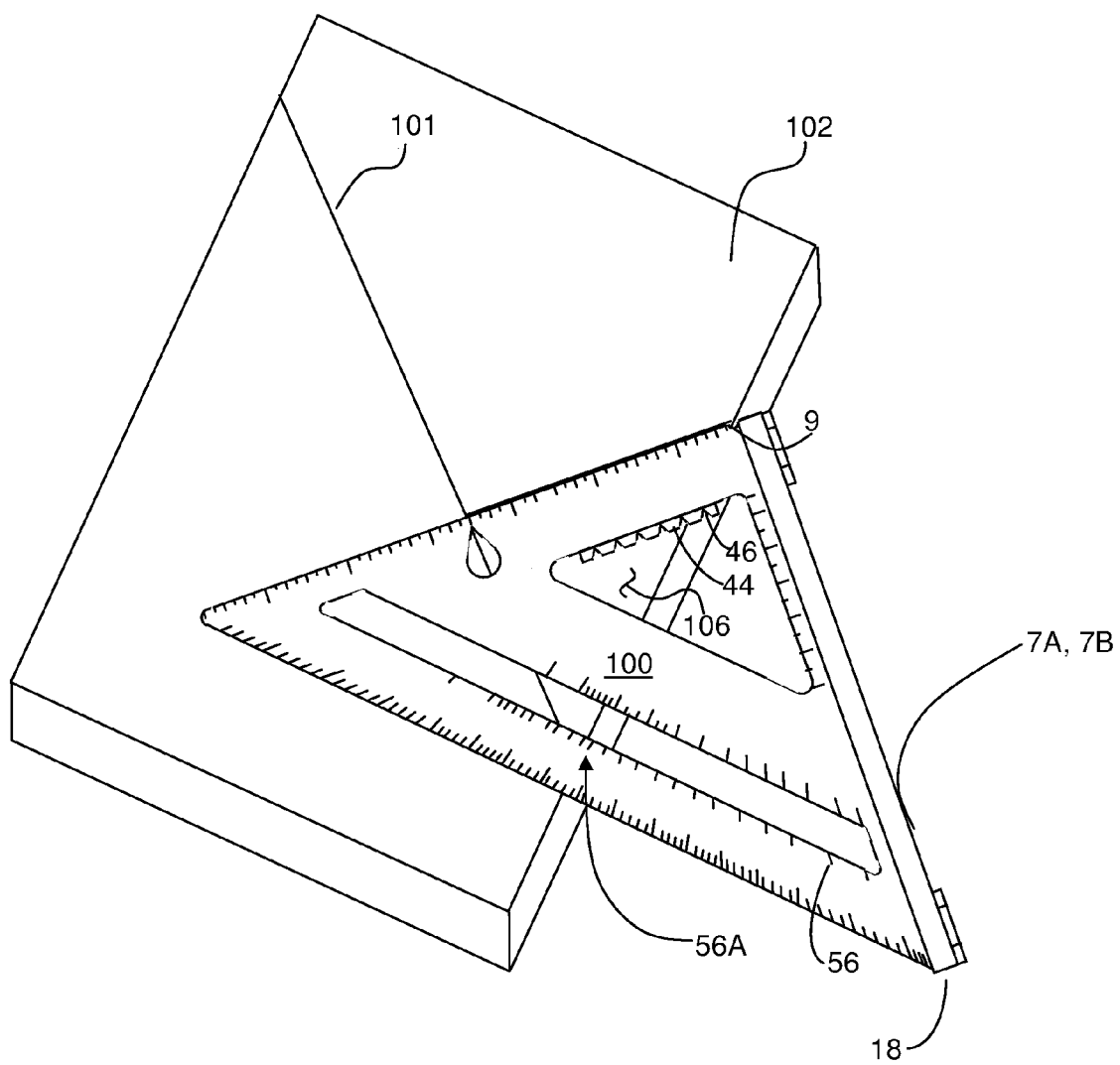
FIG. 5 is a front view of a closed tool, for measuring and marking a triangular cut on a work piece.

Referring now to FIG. 4, an isometric view of tool 100 opened to 90 degrees and placed against an outside edge of a square workpiece, for measuring and marking is shown, accordance with one embodiment of the present disclosure. First and second members 14A and 14B of tool 100 are folded to make an approximately 90 degree angle between the bottom, or first, flat surfaces 24A and 24B on the backside of the first and second members 14A and 14B in order to mark a straight line on both sides of a corner. Thus straightedges 10A and 10B of the first and second member 14A and 14B create a contiguous straightedge 110-111 drawn in a single step of one motion on first and second plane of workpiece by moving a marking instrument such as a pencil along straightedges 10A and 10B in a single virtual 2-D plane that is perpendicular to the first member 14A and the second member 14b. The straightedge lines may be marked or measured on any available angle of rotation of 0 and 180 degrees between the first member 14A and the second member 14B, e.g., an angle of rotation of 60 degree for sharp edge of a work piece.

Referring now to FIG. 5A, a front view of a fully closed tool 100 for measuring and marking a triangular cut on a workpiece is shown, in accordance with one embodiment of the present disclosure. Such triangular cuts can be referred to in the trade as a so-called "bird's mouth" on common rafters, for where the rafter will receive and rest on the ridge plate of a building wall and extend obliquely upwardly to the ridge at the desired angle. One side edge of the bird's mouth extends vertically in abutment against the vertical side wall of the ridge plate and the other side edge of the bird's mouth extends horizontally and rests on and against the upwardly facing, horizontally extending surface of the ridge plate. It is known to those skilled in the art, the method of creating a plumb line 101 on the work piece 102, using the pivot point 9, to obtain the desired unit rise measurement value 56A of common rafter marking indicia 56 is aligned with the side edge 104, and manipulating the tool for creation of the outline of the bird's mouth, or seat cut, 106.

Another use of tool 100 in accordance with the present invention as described is in marking plumb lines for hip rafter and valley rafters using hip and valley marking indicia 68 as shown in FIG. 5A. In particular, tool 100 is placed on a work piece with the abutment 7A or 7B pressed along a side edge of the work piece. The tool is rotated about the pivot point 9 so that the end 18 of the first side edge moves away from the side edge of the work piece until the desired unit rise measurement value of the hip and valley marking indicia 68 is aligned with the side edge of the work piece. A hip and valley plumb line is drawn on the work piece along the straightedge 10A or 10B.

Tool 100, in accordance with the present invention as described can also be used to scribe a line perpendicular to the edge of a work piece or a line parallel to the edge of a work piece. In particular, tool 100 is placed on a work piece with abutment 7A or 7B pressed along the side edge of a work piece. For scribing a perpendicular line, a user draws a line on the work piece along the second side edge 10 of the tool. For scribing a parallel line, a user places a pencil in an indentation 46 of the scribe bar 44 and slides the tool along the side edge of the work piece while keeping the abutment 7A or 7B pressed along the side edge. Additional information regarding the use of measurement and marking features of tool 100 tool, e.g., use as a try square, miter square, protractor, line scriber, saw guide, etc., can be found in U.S. Pat. No. 6,868,616, entitled "Builder's measuring and marking tool," filed Mar. 5, 2004, which application is incorporated herein by reference in its entirety.

Figure 6A:
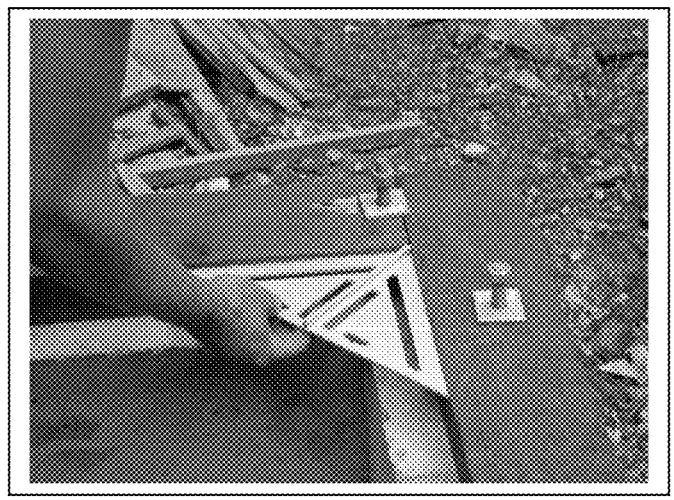
FIGS. 6A-6C illustrate the use of a tool in several different construction applications.
Figure 6B:
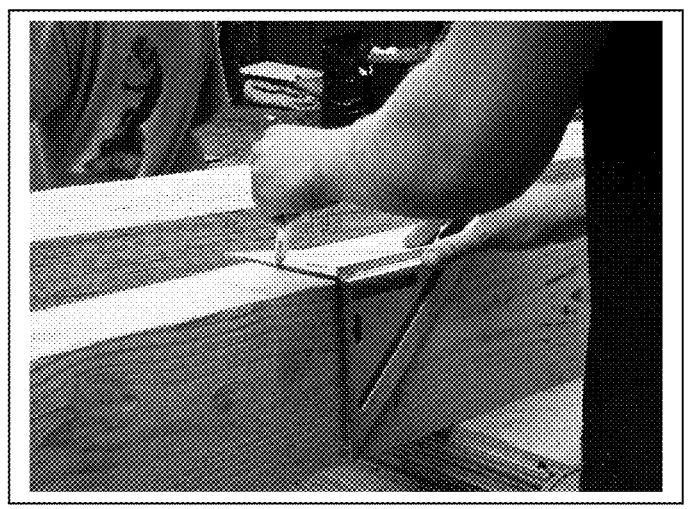
Figure 6C:
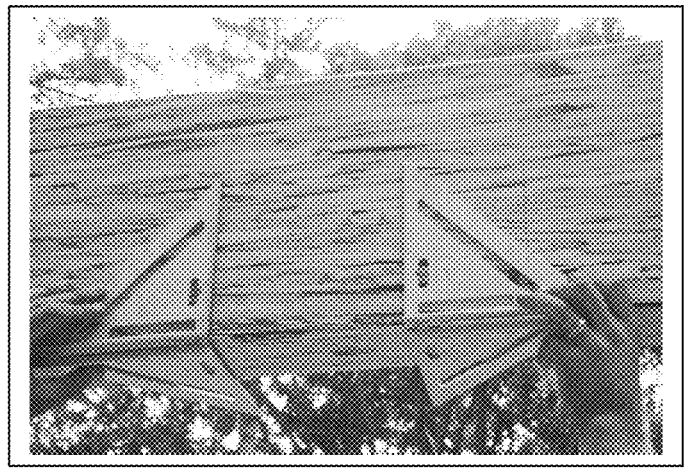

Referring to FIGS. 6A-6C, the tool is shown in several different construction applications. In one embodiment, the tool is used for measuring the squareness of a joint in FIG. 6A. In another embodiment, the tool is used for drawing a contiguous line at a given location, e.g., in a single plane, around an object or structure, e.g., a beam or joist, having a plurality of planes, e.g., two perpendicular faces or planes of a rectangular cross-section beam illustrated, as shown in FIGS. 6B-6C. To measure the squareness of a joint, the right angle of the tool may be used when the tool is in a closed position. Alternatively, the tool may be opened flat to check the squareness of a joint, wherein the hypotenuse of the first and second member is placed against the faces of a beam or structure coming together to form the joint or inside edge of the two intersecting planes. Because the present tool is flexible coupled, the faces of a beam need not be exactly perpendicular to each other; the faces can be misaligned and out of square, as many construction materials are, and the tool will still provide a contiguous line in the plurality of planes. While the plurality of planes physically intersect along the edge shown in the figure, the tool can be utilized in an application where the planes only virtually intersect, e.g., they don't physically connect, such as two non-contacting studs in close proximity that form a corner. While the present embodiments illustrate several applications of the tool in construction applications, the actual range of uses and applications of the tool is very widespread.

The present description is applicable to a wide variety of applications and is not limited to any particular type of materials, measurement markings, hinge or pivot type, sizes or geometries of surfaces other than the straightedges 10A and 10B or the bottom surfaces 24A and 24B. Rather, the present description is applicable to a wide variety of materials, measurement markings, geometries, hinges and pivot types and arrangements that meet the marking functions listed herein.

The foregoing descriptions of specific embodiments of the present disclosure have been presented for purposes of illustration and description. They are not intended to be exhaustive or to limit the invention to the precise forms disclosed. Many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:
1. A tool for marking or measuring, the tool comprising:
   a first member containing a flat surface with a straightedge for marking or measuring;
   a second member containing a flat surface with a straightedge, wherein the first member is coupled to the second member along an axis perpendicular to the straightedge of the first member;
   wherein the straightedge of the first member and the straightedge of the second member are coplanar for marking an approximately contiguous line on one or more planes when the first member and the second member are rotated to any one of a plurality of angle positions with respect to each other, wherein the plurality of angle positions include angles of approximately 0 and 180 degrees; and
   wherein the first and second members are right triangles coupled to each other, with each of the right triangles having a hypotenuse that is a straightedge.
2. The tool of claim 1 wherein the first and second members are minor images of a right isosceles triangle.
3. The tool of claim 1 wherein the first member has a length and a height, wherein the height is at least approximately 50-100% of the length.
4. The tool of claim 1 wherein the first member and the second member are right triangles coupled together to form a third and larger triangle in a fully-open position of 180 degrees.

* * * * *